US010127711B2

(12) United States Patent
Jung et al.

(10) Patent No.: US 10,127,711 B2
(45) Date of Patent: Nov. 13, 2018

(54) METHOD AND APPARATUS RENDERING CAUSTICS

(71) Applicant: SAMSUNG ELECTRONICS CO., LTD., Suwon-si (KR)

(72) Inventors: Hwiryong Jung, Seoul (KR); Nahyup Kang, Seoul (KR); Jiyeon Kim, Hwaseong-si (KR); Donghoon Sagong, Suwon-si (KR); Hyong Euk Lee, Suwon-si (KR); Minjung Son, Suwon-si (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/179,170

(22) Filed: Jun. 10, 2016

(65) Prior Publication Data

US 2017/0109920 A1  Apr. 20, 2017

(30) Foreign Application Priority Data

Oct. 20, 2015  (KR) .................. 10-2015-0145737

(51) Int. Cl.
*G06T 15/06* (2011.01)
*G06T 15/04* (2011.01)
*G06T 15/80* (2011.01)
*G06T 15/50* (2011.01)

(52) U.S. Cl.
CPC .............. *G06T 15/06* (2013.01); *G06T 15/04* (2013.01); *G06T 15/506* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 2011/0304611 | A1* | 12/2011 | Suzuki | G06T 19/006 345/419 |
| 2015/0253428 | A1* | 9/2015 | Holz | G01S 17/42 356/5.01 |
| 2015/0348314 | A1* | 12/2015 | Koguchi | G06T 15/506 345/420 |
| 2016/0343162 | A1* | 11/2016 | Jenkins | G06T 15/506 |

FOREIGN PATENT DOCUMENTS

KR  10-0898989 B1  5/2009

OTHER PUBLICATIONS

Stam, Jos. Aperiodic texture mapping. European Research Consortium for Informatics and Mathematics, 1997.*

(Continued)

*Primary Examiner* — Xiao M Wu
*Assistant Examiner* — Steven Z Elbinger
(74) *Attorney, Agent, or Firm* — NSIP Law

(57) ABSTRACT

A method of displaying caustics, the method includes determining intersection positions at which rays emitted from a light source pass through particles of a first object and meet a second object; applying caustic textures to the intersection positions; and rendering the first object using a caustic map based on a result of the applying caustic textures to the intersection positions.

27 Claims, 17 Drawing Sheets

(56) References Cited

OTHER PUBLICATIONS

Wyman, Chris, Charles Hansen, and Peter Shirley. "Interactive caustics using local precomputed irradiance." In Computer Graphics and Applications, 2004. PG 2004. Proceedings. 12th Pacific Conference on, pp. 143-151. IEEE, 2004.*

Hu, Wei, Zhao Dong, Ivo Ihrke, Thorsten Grosch, Guodong Yuan, and Hans-Peter Seidel. "Interactive volume caustics in single-scattering media." In Proceedings of the 2010 ACM SIGGRAPH symposium on Interactive 3D Graphics and Games, pp. 109-117. ACM, 2010.*

Ts'o, Pauline Y., and Brian A. Barsky. "Modeling and rendering waves: wave-tracing using beta-splines and reflective and refractive texture mapping." ACM Transactions on Graphics (TOG) 6, No. 3 (1987): 191-214.*

González, Francisco, and Gustavo Patow. "Continuity mapping for multi-chart textures." ACM Transactions on Graphics (TOG) 28, No. 5 (2009): 109.*

Watt, Mark. "Light-water interaction using backward beam tracing." ACM SIGGRAPH Computer Graphics 24, No. 4 (1990): 377-385.*

Liu, Xinguo, Zhao Dong, Hujun Bao, and Qunsheng Peng. "Caustic spot light for rendering caustics." The Visual Computer 24, No. 7-9 (2008): 485-494.*

Liu, Xinguo, et al. "Caustic Spot Light for Rendering Caustics." *The Visual Computer* 24.7-9 (2008): 485-494.

* cited by examiner

FIG. 9
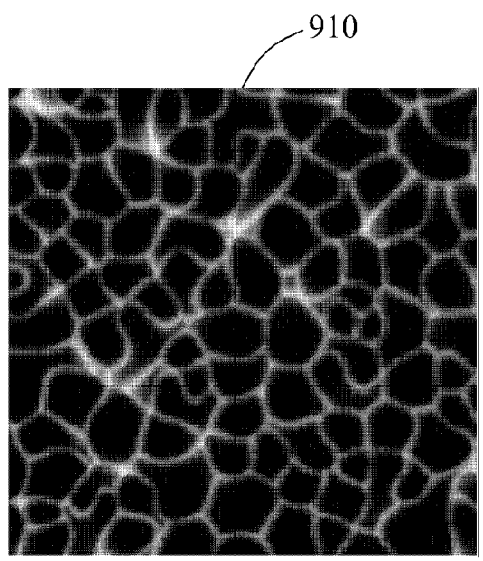
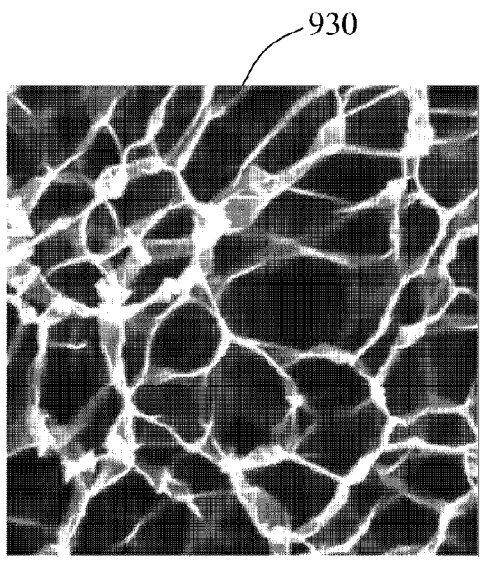
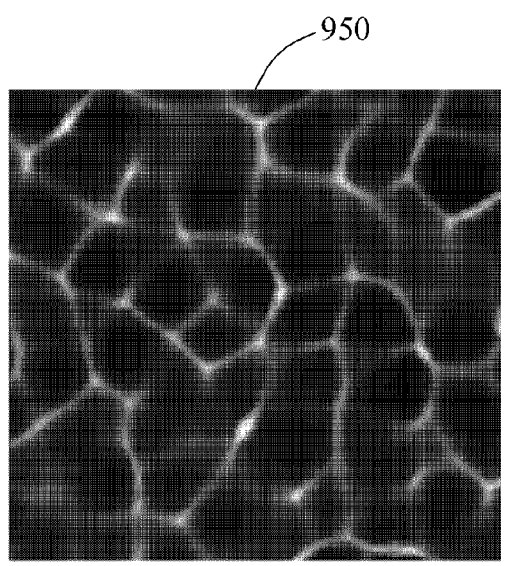

METHOD AND APPARATUS RENDERING CAUSTICS

CROSS-REFERENCE TO RELATED APPLICATION(S)

This application claims the benefit under 35 USC § 119(a) of Korean Patent Application No. 10-2015-0145737 filed on Oct. 20, 2015, in the Korean Intellectual Property Office, the entire disclosure of which is incorporated herein by reference for all purposes.

BACKGROUND

1. Field

The following description relates to a method and apparatus for rendering caustics.

2. Description of Related Art

Caustics are various light patterns shown when light is reflected or refracted by a transparent or semitransparent object, for example, water, glasses or plastics, and hits a neighboring object. Modeling of caustics require a large amount of calculation and time to calculate positions of collisions of a large number of rays emitted from a light source and refracted or reflected by a neighboring object. Accordingly, it has, heretofore been difficult to perform modeling of caustics in real time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a method of displaying caustics includes determining intersection positions at which rays emitted from a light source pass through particles of a first object and meet a second object; applying caustic textures to the intersection positions; and rendering the first object using a caustic map based on a result of the applying caustic textures to the intersection positions.

Determining of the intersection positions may include tracing a path of the rays and calculating the intersection positions for each of the particles.

The method may further include receiving at least one of information about a position of the light source, a depth map pre-rendered from the position of the light source, positions of the particles, and a surface normal vector of the first object, wherein the determining of the intersection positions comprises calculating the intersection positions for each of the particles based on the received information.

The determining of the intersection positions may include calculating intersection positions for particles directly visible from the light source among the particles.

The determining of the intersection positions for the particles directly visible from the light source may include determining the particles directly visible from the light source among the particles.

The determining of the particles directly visible from the light source may include determining the particles directly visible from the light source among the particles, based on first depth information of a depth map pre-rendered from a position of the light source.

The determining of the particles directly visible from the light source may include determining whether the rays directly reach the particles based on a result of a comparison between the first depth information and second depth information of the particles, the second depth information acquired by converting positions of the particles viewed from a viewpoint to a space of a virtual camera in the position of the light source.

The applying of the caustic textures to the intersection positions may include marking vertices corresponding to the intersection positions; and applying the caustic textures to the vertices.

The applying of the caustic textures to the vertices may include selecting the caustic textures based on at least one of a fluid surface curvature of each of the particles corresponding to the vertices or a distance between the vertices and the particles; and placing the selected caustic textures on the caustic map to correspond to the vertices.

The placing of the selected caustic textures on the caustic map may include placing virtual particles on the caustic map based on a complexity of particles corresponding to the selected caustic textures; generating, based on the virtual particles, caustic lines used to connect the selected caustic textures to each other; and connecting the selected caustic textures to each other by the caustic lines.

The generating of the caustic lines may include generating the caustic lines at equal distances from particles corresponding to an outline of each of the selected caustic textures and neighboring virtual particles.

The applying of the caustic textures to the intersection positions may include controlling an application intensity of the caustic textures based on an angle between a surface normal vector of the first object and an incident direction of the rays.

The controlling of the application intensity may include increasing the application intensity in response to the surface normal vector being parallel to the incident direction; and decreasing the application intensity in response to the surface normal vector being perpendicular to the incident direction.

The applying of the caustic textures to the intersection positions may include adjusting an application size of the caustic textures based on a distance between positions of surface particles of a surface of the first object and intersection positions corresponding to the surface particles.

The adjusting of the application size may include adjusting the application size so that the caustic textures appear larger in response to the distance being greater than a preset reference value; and adjusting the application size so that the caustic textures appear smaller in response to the distance being less than the reference value.

The rendering of the first object may include combining the caustic map with at least one of a specular map and a diffuse map.

The caustic textures may be stored in advance in correspondence to the particles, or may be generated by connecting and interpolating the stored caustic textures based on light and an external force exerted on the first object.

The first object may have transparent or semitransparent properties allowing the rays to be refracted and reflected by passing through the first object.

A non-transitory computer readable medium may store instructions for causing computing hardware to perform the method.

According to another general aspect, a caustic rendering apparatus includes a processor configured to calculate intersection positions at which rays emitted from a light source pass through particles of a first object and meet a second object, and to render the first object using a caustic map generated by applying caustic textures to the intersection positions; and a memory configured to store the caustic textures.

The apparatus may further include a receiver configured to receive at least one information among a position of the light source, a depth map pre-rendered from the position of the light source, positions of the particles, and a surface normal vector of the first object, wherein the processor is configured to calculate the intersection positions for each of the particles based on the at least one received information.

The processor may be configured to determine particles directly visible from the light source among the particles and to calculate intersection positions for the particles directly visible from the light source.

The processor may be configured to mark vertices corresponding to the intersection positions and to apply the caustic textures to the vertices.

The processor may be configured to select the caustic textures based on at least one of a fluid surface curvature of each of the particles corresponding to the vertices and a distance between the vertices and the particles, and to place the selected caustic textures on the caustic map to correspond to the vertices.

The processor may be configured to place virtual particles on the caustic map based on a complexity of particles corresponding to the selected caustic textures, to generate, based on the virtual particles, caustic lines used to connect the selected caustic textures to each other, and to connect the selected caustic textures to each other by the caustic lines.

The processor may be configured to control an application intensity of the caustic textures based on an angle between a surface normal vector of the first object and an incident direction of the rays, and to adjust an application size of the caustic textures based on a distance between positions of surface particles of a surface of the first object and intersection positions corresponding to the surface particles.

The caustic textures may be stored in advance in correspondence to the particles, or may be generated by connecting and interpolating the stored caustic textures based on light and an external force exerted on the first object.

The method may further include, actuating a monitor to display the rendered first object to a user.

Other features and aspects will be apparent from the following detailed description, the drawings, and the claims.

BRIEF DESCRIPTION OF THE DRAWINGS

FIG. 9 illustrates caustic textures in accordance with one or more embodiments.

Figure 1:
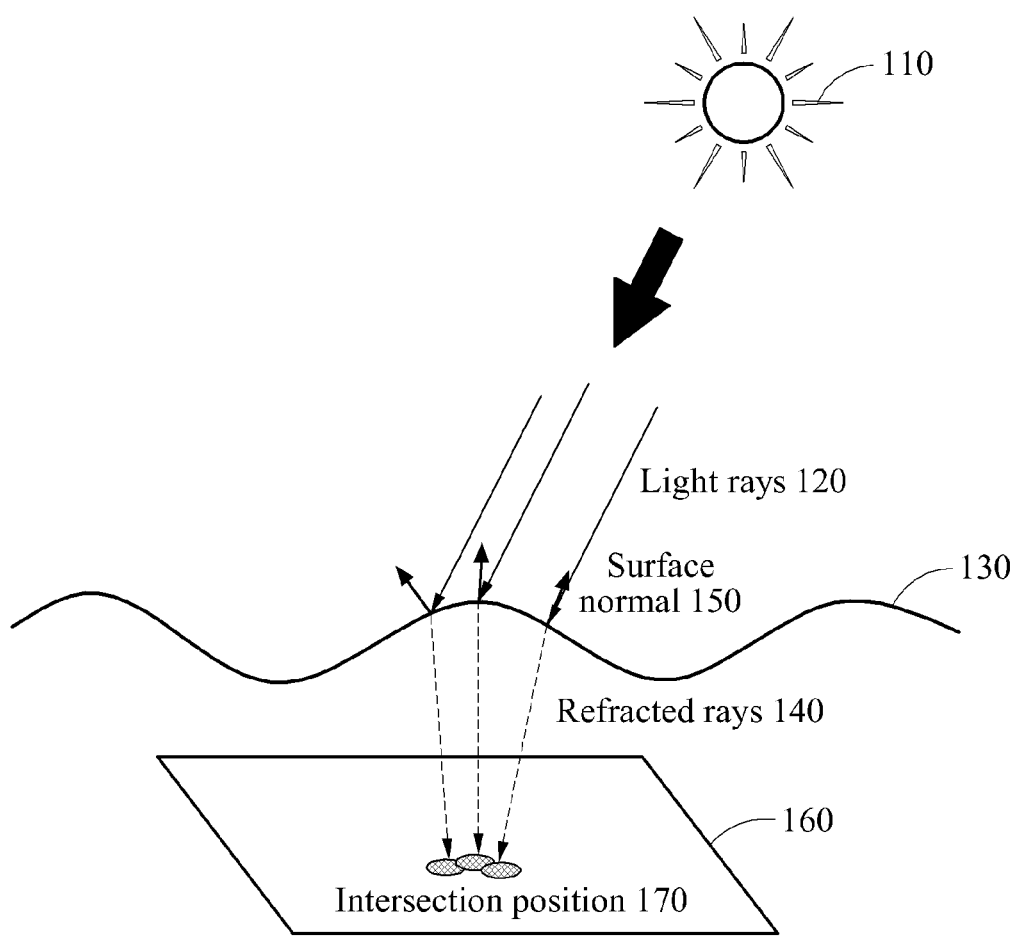
FIG. 1 illustrates a process of generating caustics by light incident on a first object in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates a process of generating caustics by light incident on a first object in accordance with one or more embodiments.

Referring to FIG. 1, a caustic effect appears on a bottom surface when light incident on the first object, for example, water is refracted.

Rays 120 of light emitted from a light source 110 reach a water surface 130 in a direction indicated by a solid arrow. The rays 120 are refracted by water and/or reflected from the water along a surface normal 150 of the water surface 130. Refracted or reflected rays 140 meet a bottom surface 160 that is a neighboring object. A point at which each of the refracted or reflected rays 140 meets or collides with the bottom surface 160 is referred to as an "intersection position" 170. When a large number of intersection positions 170 are generated, reticulated light patterns, that is, caustics are generated on the bottom surface 160.

Figure 2:
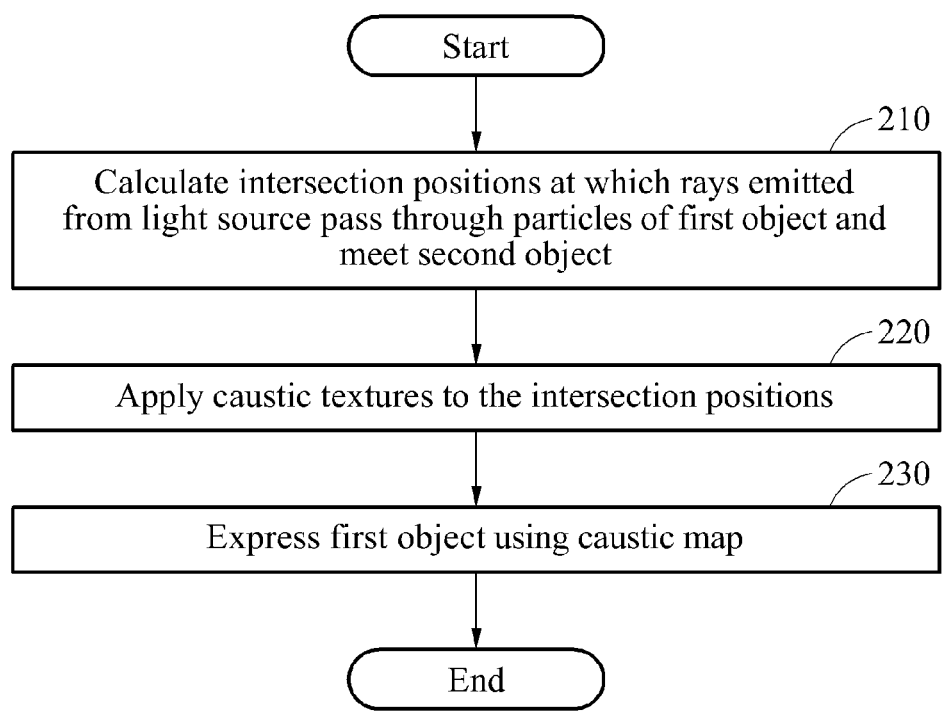
FIG. 2 illustrates a method of expressing caustics in accordance with one or more embodiments.

FIG. 2 illustrates a method of expressing caustics in accordance with one or more embodiments.

Referring to FIG. 2, in operation 210, an expression apparatus in accordance with one or more embodiments calculates intersection positions at which rays emitted from a light source pass through particles of a first object and meet a second object. The first object is a transparent or semi-transparent object. The first object includes, for example, a fluid, for example, water, water vapor, a solid, for example, a glass, or an elastic body with an elasticity, for example, a transparent rubber ball. The first object has transparent or semitransparent properties allowing the rays to be reflected and refracted by passing through the first object. The first object may be modeled, for example, by particles of various sizes. An example of the first object modeled by particles is described with reference to FIG. 5.

The second object with which rays collide is an opaque object. The second object is, for example, a bottom surface or an obstacle located in water, clouds, or other transparent or semitransparent medium.

Operation 210 is performed to determine a caustic expression position, and the expression apparatus traces a path of the rays and calculates the intersection positions for each of the particles. The intersection positions for each of the particles are calculated using a any suitable refraction equation. An example of a scheme by which the expression apparatus of one or more embodiments calculates to determine intersection positions of the ray with the particles is described with reference to FIG. 4.

Prior to calculating of the intersection positions, the expression apparatus receives scene information, for example, a position of the light source, a depth map pre-rendered from the position of the light source, positions of the particles, and a surface normal vector of the first object (or the particles). The expression apparatus calculates the intersection positions for each of the particles based on the received information.

The expression apparatus determines particles directly visible from the light source among the particles, and calculates intersection positions for the particles directly visible from the light source. The particles directly visible from the light source are, for example, surface particles of a surface of the first object, or surface particles of the first object that are not covered or occluded by an obstacle.

The expression apparatus calculates intersection positions corresponding to points at which the rays reach an object by passing through the particles directly visible from the light source. A scheme, according to one or more embodiments, of determining particles directly visible from the light source is described with reference to FIG. 6.

In operation 220, the expression apparatus applies caustic textures to the intersection positions calculated in operation 210. The expression apparatus marks vertices corresponding to the intersection positions on a bottom surface, and applies the caustic textures to the vertices. Examples of caustic textures are described with reference to FIG. 9.

The expression apparatus uses caustic textures which may be stored in advance in correspondence to the particles without a change, or the textures may be modified such as by, for example, connections, interpolations, extrapolations, and the like, in real time. Such stored caustic textures, based on an external force exerted on the first object, to transformatively apply the caustic textures to the vertices in light of the external force.

For example, when an external force is exerted on a fluid modeled on a screen of a mobile phone through an interaction with a user, for example, moving the mobile phone or touching a fluid region on the screen, the expression apparatus expresses caustics by connecting and interpolating, in real time, stored caustic textures based on the external force. In this example, the expression apparatus controls an application intensity of the caustic textures or adjusts an application size of the caustic textures.

Examples of a scheme by which the expression apparatus applies the caustic textures to the intersection positions, according to one or more embodiments, are described with reference to FIGS. 10, 11 and 12.

In operation 230, the expression apparatus expresses the first object using a caustic map based on a result of operation 220. The caustic map is referred to as a "caustic sprite map." For example, the expression apparatus expresses the first object by combining the caustic map with, for example, a specular map or a diffuse map. Examples of a scheme by which the expression apparatus expresses the first object using a generated caustic map, according to one or more embodiments, are described with reference to FIGS. 13 and 14.

Figure 3:
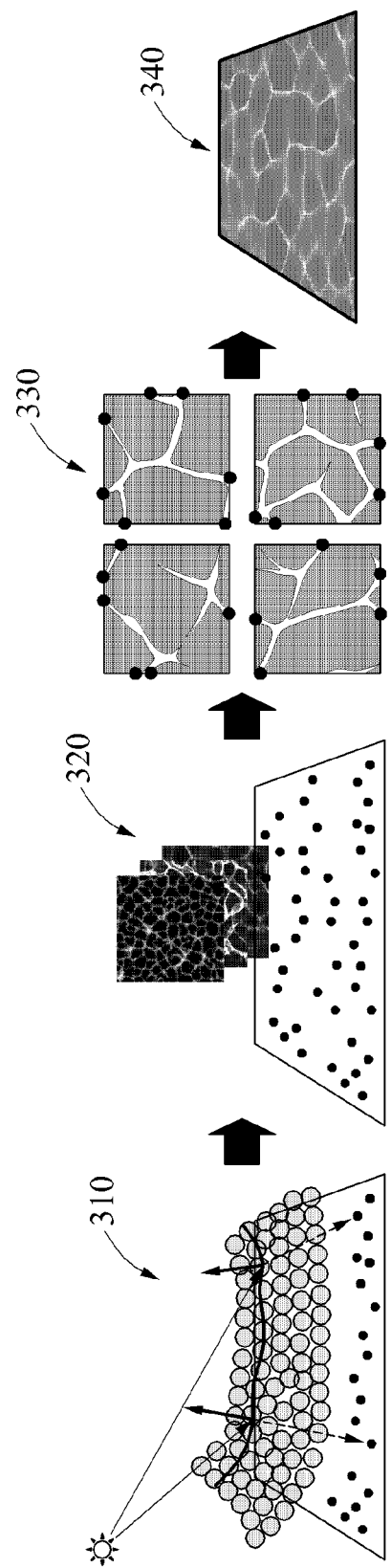
FIG. 3 illustrates a process of expressing caustics in accordance with one or more embodiments.

FIG. 3 illustrates a process of expressing caustics in accordance with one or more embodiments. Referring to FIG. 3, in operation 310, an expression apparatus in accordance with one or more embodiments calculates intersection positions at which rays emitted from a light source pass through particles of a first object and meet a second object, by tracing a path of the rays for each of the particles. The calculated intersection positions correspond to positions in which caustics are expressed.

In operation 320, the expression apparatus places caustic textures based on the intersection positions calculated in operation 310. In operation 320, the expression apparatus marks vertices corresponding to the intersection positions on a bottom surface. For example, the expression apparatus selects caustic textures based on a fluid surface curvature of each of particles corresponding to the vertices and a distance between the vertices and the particles. In this example, the expression apparatus places the selected caustic textures on a caustic map to correspond to the vertices.

In operation 330, the expression apparatus generates caustic lines used to connect the placed caustic textures to each other, and connects the caustic textures to each other by the caustic lines.

Operations 320 and 330 correspond to operation 220 of FIG. 2 in which the caustic textures are applied to the intersection positions.

In operation 340, the expression apparatus expresses the first object using the caustic map based on an application result of the caustic textures.

Figure 4:
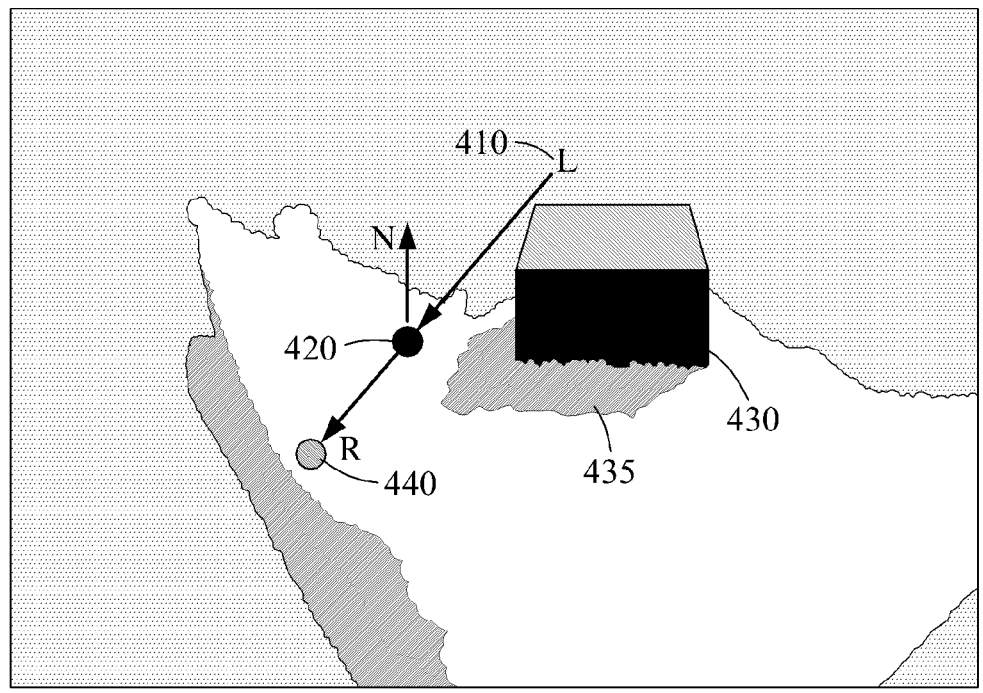
FIG. 4 illustrates a scheme of expressing a first object modeled by particles when a second object is included in a portion of the first object, in accordance with one or more embodiments.

FIG. 4 illustrates an example of a scheme of expressing a first object modeled by particles when a second object is included in a portion of the first object, in accordance with one or more embodiments.

Referring to FIG. 4, a ray emitted from a light source L 410 is refracted or reflected at a particle 420 of a first object, for example, a body of water, such as a pond, lake, sea, or the like. In the first object, waves hit, and a cube-shaped second object 430 is in a portion of the first object.

A calculation to locate an intersection R 440 corresponding to a position in which the ray emitted from the light source L 410 is refracted or reflected by a surface normal vector N of the first object and hits a neighboring second object is performed for each particle.

For example, intersection positions are calculated for particles directly visible from a light source, for example, a portion of the first object represented by white in FIG. 4, among particles of the first object. In a portion 435 of the first object in FIG. 4, particles are not directly visible from the light source because the particles are covered by the second object 430. The portion 435 is excluded from calculation of intersection positions. In accordance with one or more embodiments, intersection positions are calculated for a portion of the particles of the first object (for example, surface particles of the first object directly visible from the light source), instead of all the particles of the first object, and thus it is possible to reduce both an amount of calculation and a time required to calculate intersection positions.

Figure 18:
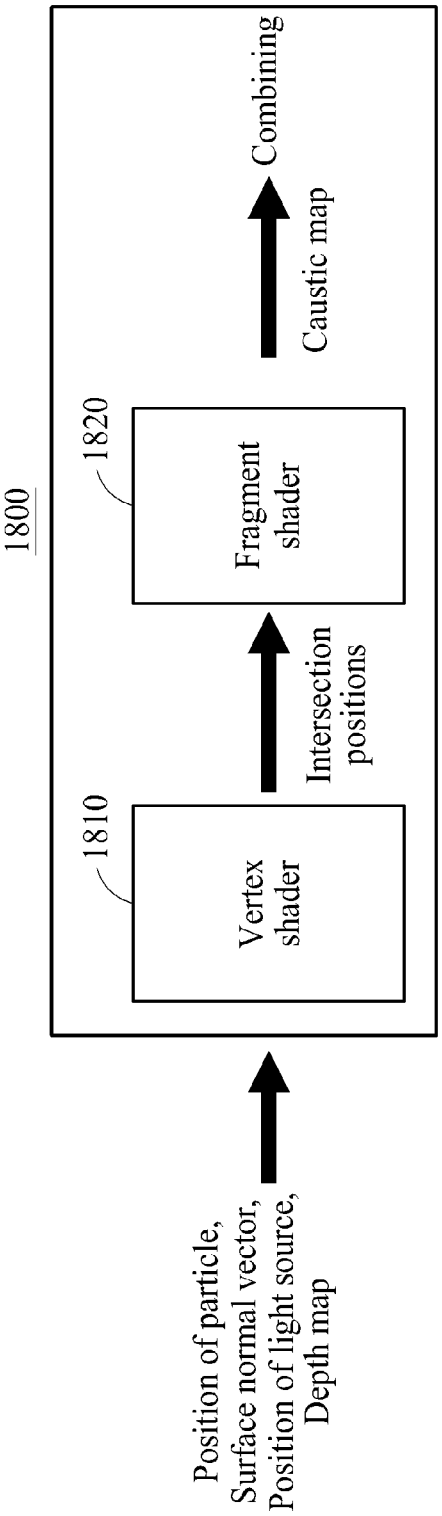
FIG. 18 illustrates an operation of a processor in an expression apparatus in accordance with one or more embodiments.

An expression apparatus in accordance with one or more embodiments calculates intersection positions for each particle using a vertex shader, for example, a vertex shader 1810 of FIG. 18. A fragment shader, for example, a fragment shader 1820 of FIG. 18 receives the intersection positions from the vertex shader, and applies caustic textures directly to the intersection positions.

Figure 5:
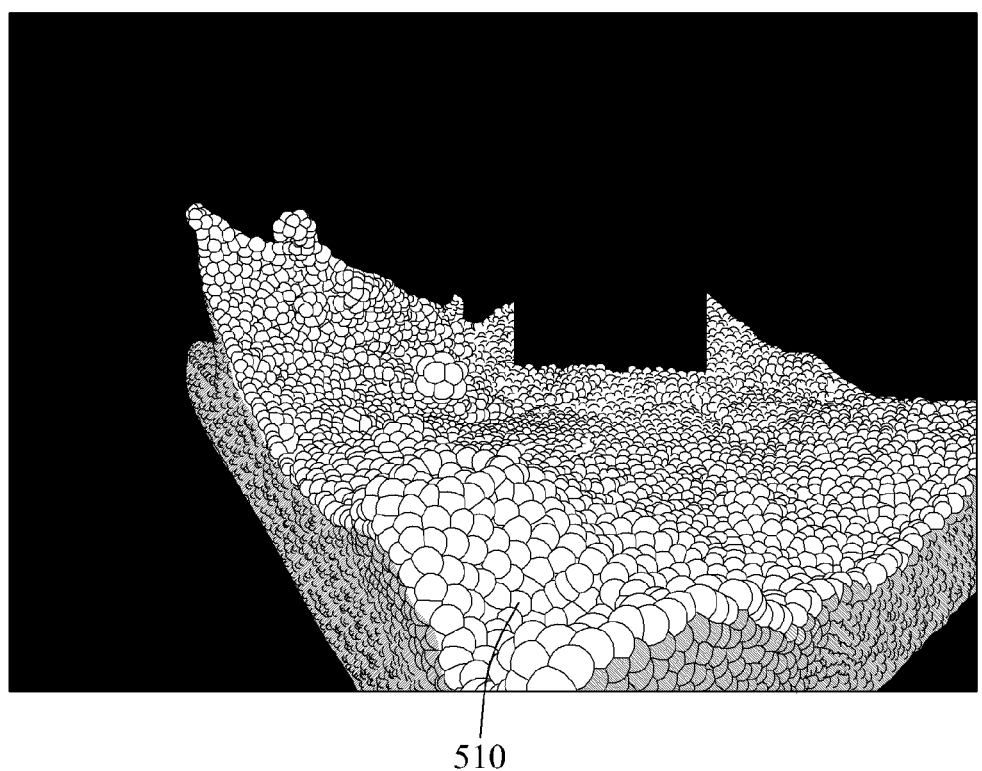
FIG. 5 illustrates a first object modeled by particles in accordance with one or more embodiments.

FIG. 5 illustrates an example of a first object modeled by particles in accordance with one or more embodiments.

FIG. 5 illustrates a region 510 of the first object.

An expression apparatus in accordance with one or more embodiments performs sampling of the first object at a relatively low resolution, and calculates intersection positions. The "relatively low resolution" may be understood to refer to a resolution lower than a resolution of a final caustic effect.

The expression apparatus coarsely places particles in the region 510, and calculates intersection positions for each of the particles. The expression apparatus applies caustic textures to the calculated intersection positions, and thus it is possible to enhance a visual quality.

Figure 6:
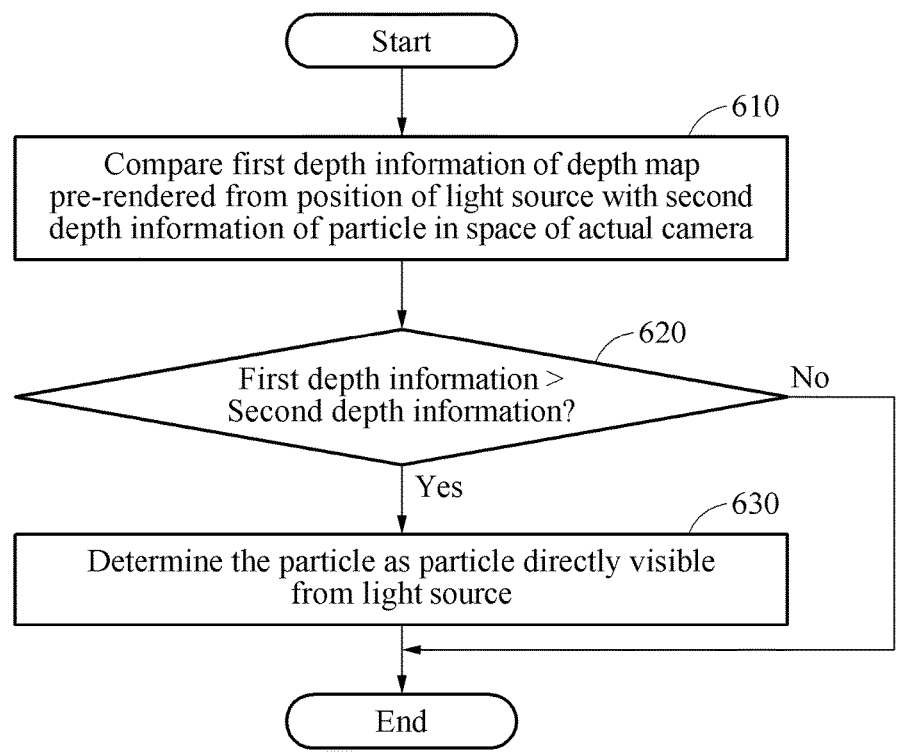
FIG. 6 illustrates a scheme of determining a particle directly visible from a light source in accordance with one or more embodiments.

FIG. 6 illustrates an example of a scheme of determining particles directly visible from a light source in accordance with one or more embodiments.

Referring to FIG. 6, an expression apparatus in accordance with one or more embodiments, distinguishes particles directly visible from a light source from particles which are not directly visible from the light source based on, for example, a depth map pre-rendered from a position of the light source.

Figure 7:
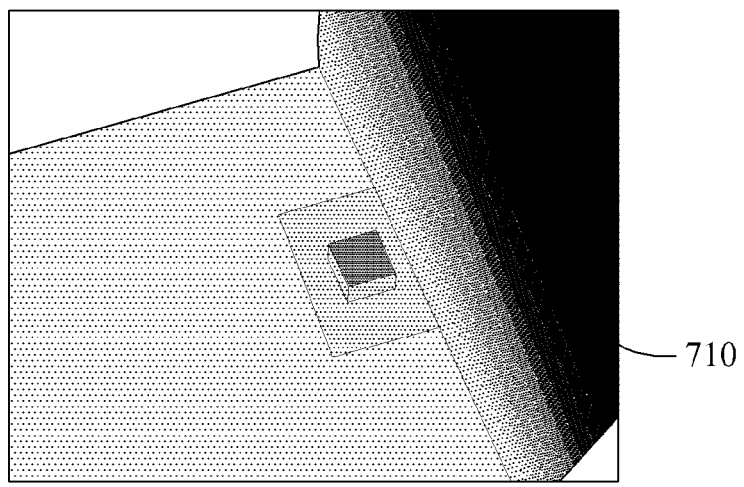
FIG. 7 illustrates a depth map pre-rendered from a position of a light source in accordance with one or more embodiments.

The expression apparatus determines particles directly visible from the light source based on first depth information of the depth map, as shown in FIG. 7.

In operation 610, the expression apparatus compares the first depth information with second depth information of particles in a space of the light source. The "second depth information" is acquired by converting positions of particles viewed from an intended viewpoint, a non-virtual, or "actual" camera to a space of a virtual camera in the position of the light source. The second depth information is understood as actual depth information or an actual depth value of the particles. The first depth information and the second depth information are referred to as a "first depth value," and a "second depth value," respectively.

In operation 620, the expression apparatus determines whether the second depth information is less than the first depth information. When the second depth information is determined to be equal to or greater than the first depth information in operation 620, the expression apparatus determines particles as particles that are not directly visible from the light source, that is, covered particles, and terminates an operation of FIG. 6.

When the second depth information is determined to be less than the first depth information in operation 620, the expression apparatus determines particles as particles directly visible from the light source in operation 630. The expression apparatus calculates intersection positions for the particles visible from the light source.

FIG. 7 illustrates an example of a depth map 710 pre-rendered from a position of a light source in accordance with one or more embodiments.

The depth map 710 is calculated prior to calculation of intersection positions. In the depth map 710, particles are represented by various gray levels from white to black.

A white portion of the depth map 710 corresponds to particles far from eyes of a user, and a black portion of the depth map 710 corresponds to particles close to the eyes. When colors of the particles in the depth map 710 change from black to white, a distance between the particles and the eyes increases.

For example, in the depth map 710, when depth information, that is, a depth value of particles represented by white is set to "1," a depth value of particles represented by black is set to "0."

Figure 8:
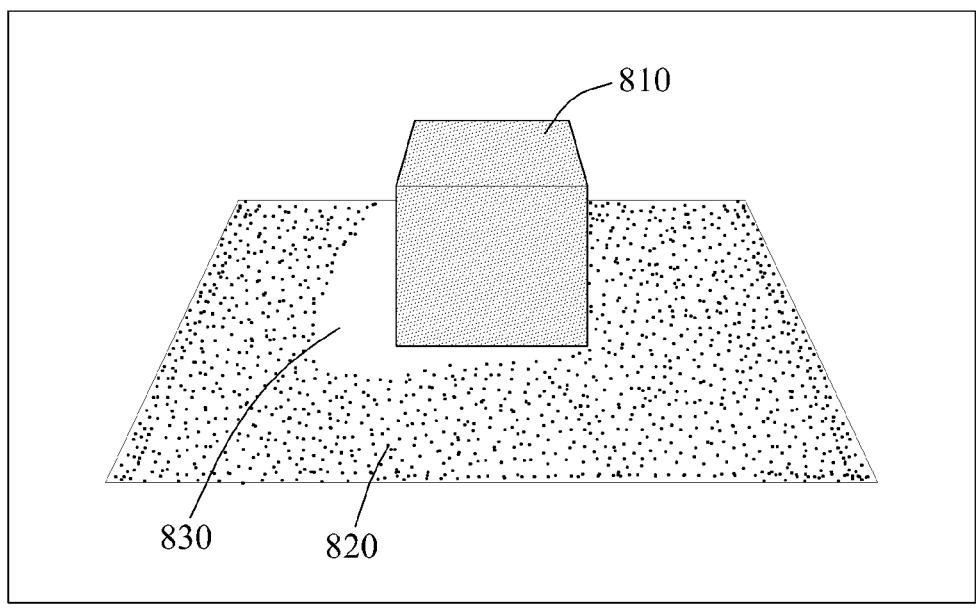
FIG. 8 illustrates a result of marking vertices in intersection positions calculated for each particle in accordance with one or more embodiments.

FIG. 8 illustrates an example of a result of representing vertices in intersection positions calculated for each particle in accordance with one or more embodiments.

As described above, an expression apparatus in accordance with one or more embodiments performs sampling of particles of a first object at a relatively low resolution, and calculates intersection positions. For example, referring to FIG. 8, when vertices 820 are marked in intersection positions, the vertices 820 are coarsely distributed on a bottom surface. In this example, the vertices 820 are marked in intersection positions corresponding to particles directly visible from a light source, instead of intersection positions 830 corresponding to particles that are covered by a second object 810 and that are not directly visible from the light source.

The expression apparatus applies caustic textures to vertices, to increase a visual quality. By applying caustic textures to vertices, a caustic map is generated. Examples of caustic textures are described with reference to FIG. 9, and examples of a scheme of applying caustic textures to vertices are described with reference to FIGS. 10 through 12.

FIG. 9 illustrates examples of caustic textures in accordance with one or more embodiments.

Referring to FIG. 9, according to one or more embodiments, caustic textures 910, 930 and 950 may be generated in advance to have, for example, a wave pattern. Caustic textures generated in advance are stored in a database or a memory of an expression apparatus, and a processor reads the stored caustic textures from the memory and uses the caustic textures.

Also, the caustic textures 910, 930 and 950 are generated with a high resolution using a traditional scheme, based on light and an external force applied to the first object during rendering. When various external forces are exerted, for example, when a stone is thrown into still water or when a wind blows hard, the expression apparatus generates caustic textures with a high resolution based on the external forces.

In an example, the expression apparatus calculates caustic textures with a high resolution at regular intervals. In another example, when a predetermined condition is satisfied, for example, when a change by a predetermined intensity occurs due to an external force exerted on a surface of the first object, the expression apparatus calculates caustic textures with a high resolution. At other times, the relatively lower resolution with coarse packing techniques, as discussed above, may be employed.

Figure 10:
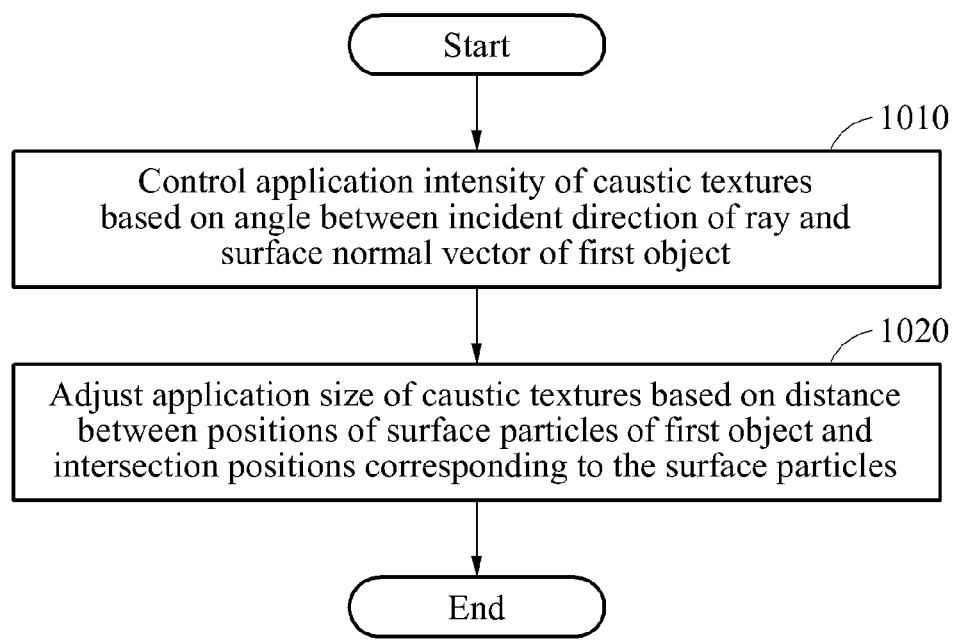
FIG. 10 illustrates a scheme of applying caustic textures in accordance with one or more embodiments.

FIG. 10 illustrates an example of a scheme of applying caustic textures in accordance with one or more embodiments. Referring to FIG. 10, in operation 1010, an expression apparatus in accordance with one or more embodiments controls an application intensity of the caustic textures based on an angle between an incident direction of a ray and a surface normal vector of a first object or a surface normal vector of particles of the first object. The application intensity is determined based on, for example, an angle between the light source and the surface normal vector of the first object, or is proportional to an intensity of the light source and N•(-L).

In an example, when a normal vector of the particles of the first object directs toward the light source, the application intensity increases. In another example, when the normal vector is perpendicular to the light source, the application intensity decreases. The "application intensity" is understood to refer to a clearness or sharpness of a pattern of a caustic texture to be applied. For example, when the application intensity increases, a clear and thick wave pattern is expressed. When the application intensity decreases, a dim and cloudy wave pattern is expressed.

In operation 1010, in an example, the expression apparatus increases the application intensity when the surface normal vector of the first object is parallel to the incident direction. In another example, the expression apparatus decreases the application intensity when the surface normal vector of the first object is perpendicular to the incident direction.

In operation 1020, the expression apparatus adjusts an application size of the caustic textures based on a distance between positions of surface particles of the first object and intersection positions corresponding to the surface particles. The application size is understood as a "size of a caustic sprite."

In operation 1020, in an example, when the distance is greater than a preset reference value, the expression apparatus adjusts the application size so that the caustic textures appear large. In another example, when the distance is less than the reference value, the expression apparatus adjusts the application size so that the caustic textures appear small.

Figure 11:
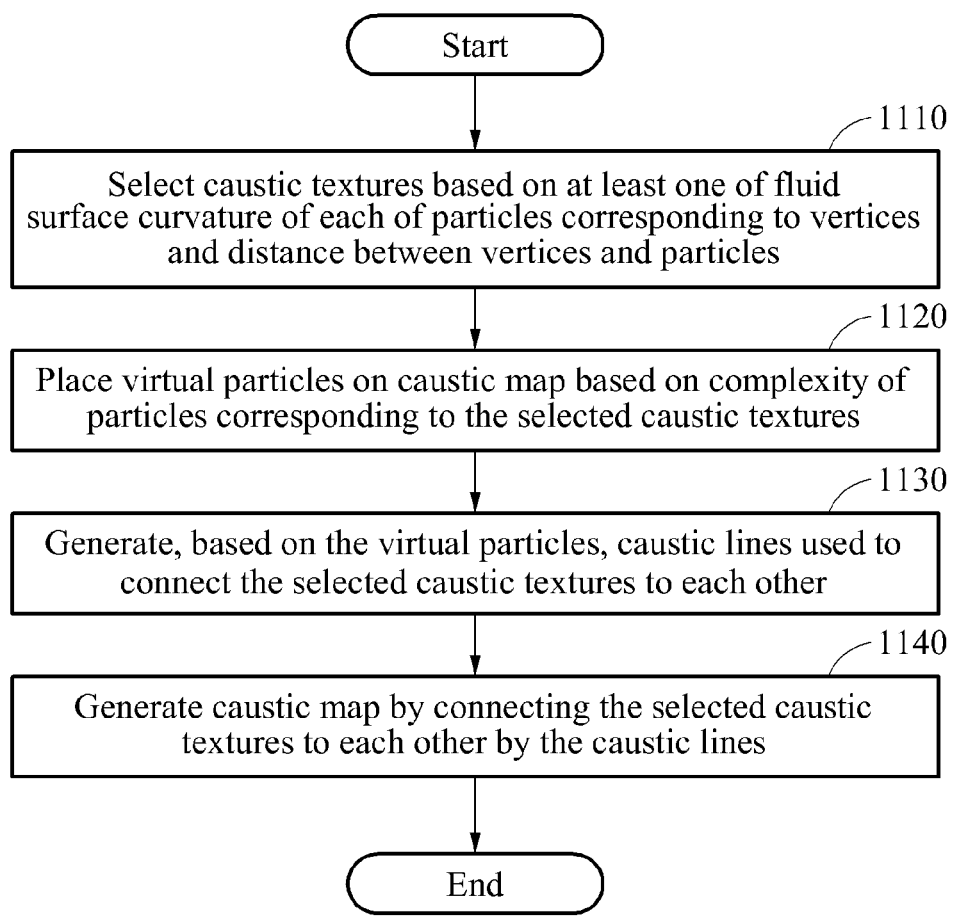
FIG. 11 illustrates another scheme of applying caustic textures in accordance with one or more embodiments.

FIG. 11 illustrates another example of a scheme of applying caustic textures in accordance with one or more embodiments. Referring to FIG. 11, in operation 1110, an expression apparatus in accordance with one or more embodiments selects caustic textures based on at least one of a fluid surface curvature of each of particles corresponding to vertices and a distance between the vertices and the particles.

The expression apparatus places the selected caustic textures on a caustic map to correspond to the vertices. In operation 1120, the expression apparatus places virtual particles on the caustic map based on a complexity of particles corresponding to the selected caustic textures.

In operation 1130, the expression apparatus generates, based on the virtual particles, caustic lines used to connect the selected caustic textures to each other. For example, the expression apparatus generates the caustic lines at equal distances from particles corresponding to outlines of the selected caustic textures and neighboring virtual particles.

In operation 1140, the expression apparatus generates the caustic map by connecting the selected caustic textures to each other by the caustic lines.

Figure 12:
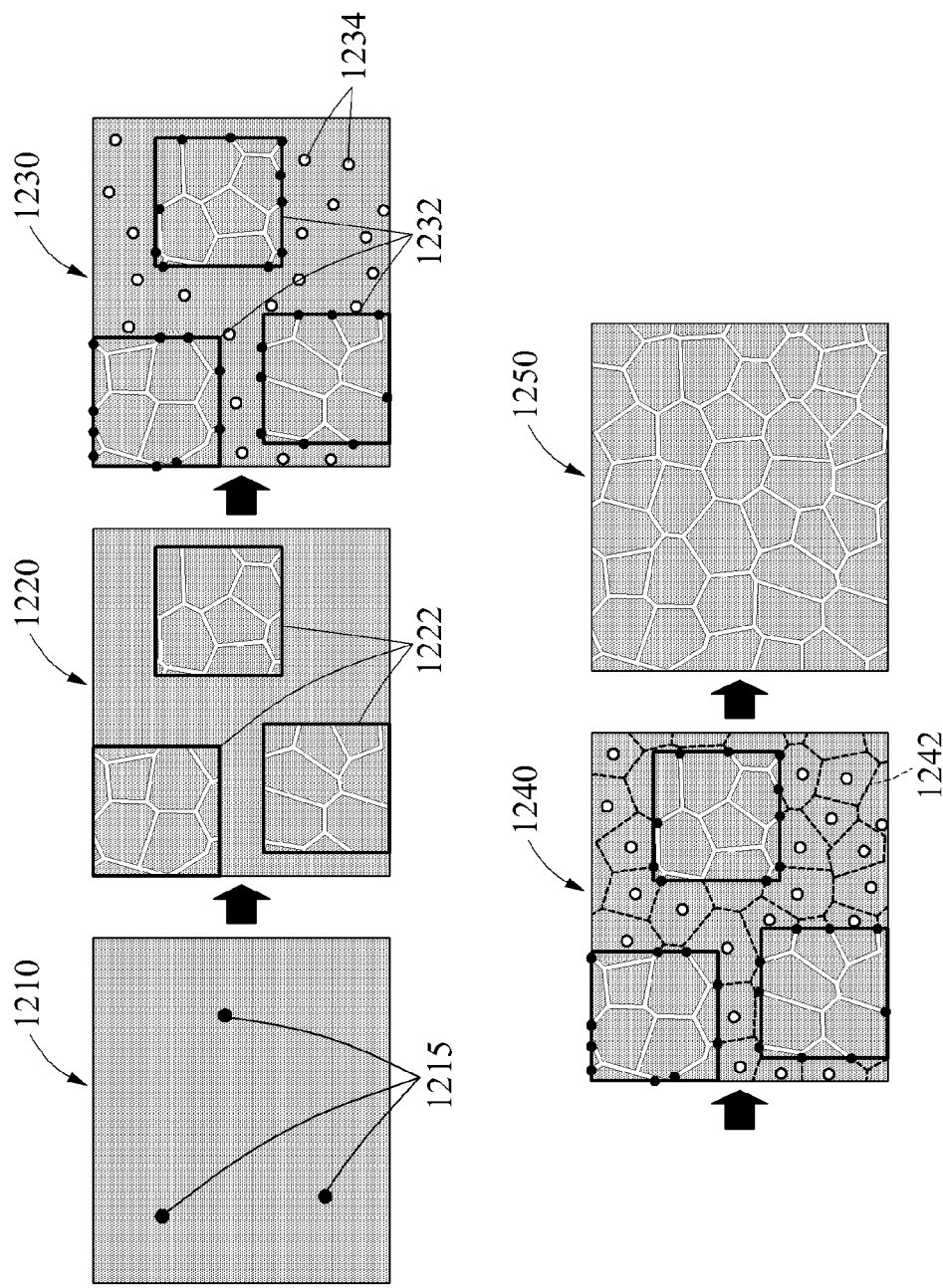
FIG. 12 illustrates applying caustic textures in accordance with one or more embodiments.

FIG. 12 illustrates an example of applying caustic textures in accordance with one or more embodiments.

Referring to FIG. 12, in operation 1210, an expression apparatus in accordance with one or more embodiments traces a path of rays, determines intersection positions 1215 for each particle, and determines caustic expression positions.

In operation 1220, the expression apparatus selects caustic textures 1222 based on at least one of a fluid surface curvature of each of particles corresponding to vertices and a distance between the vertices and the particles.

In operation 1230, the expression apparatus places virtual particles 1234 on a caustic map based on a complexity of particles corresponding to the selected caustic textures 1222.

In operation 1240, the expression apparatus generates, based on the virtual particles 1234, caustic lines 1242 used to connect the selected caustic textures 1222 to each other. The expression apparatus generates the caustic lines 1242 based on the virtual particles 1234, at equal distances from particles corresponding to outlines 1232 of the selected caustic textures 1222 and neighboring virtual particles 1234.

In operation 1250, the expression apparatus generates the caustic map by connecting patterns of the selected caustic textures 1222 to each other by the caustic lines 1242.

Figure 13:
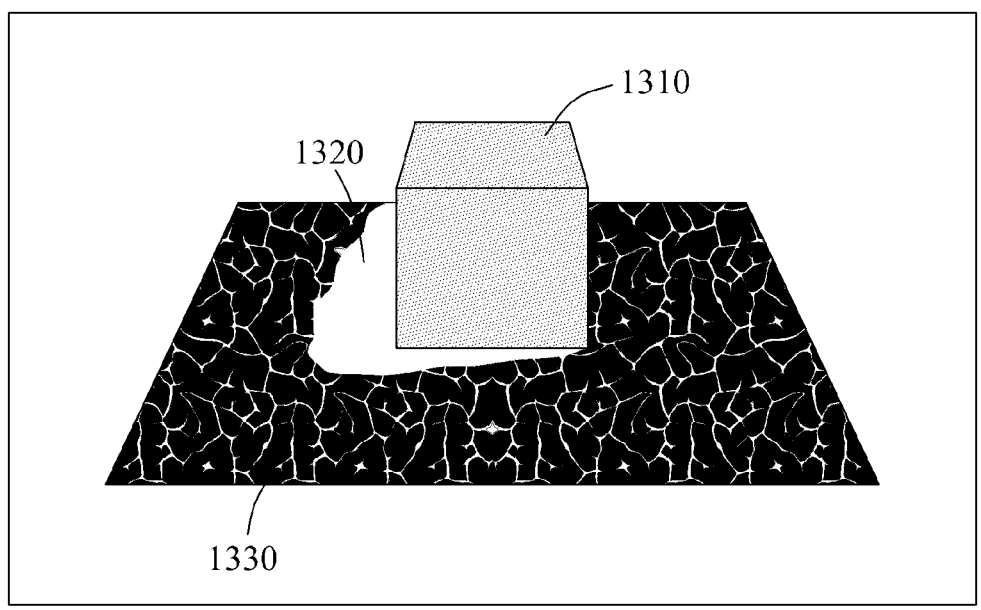
FIG. 13 illustrates a generated caustic map in accordance with one or more embodiments.

FIG. 13 illustrates an example of a generated caustic map 1330 in accordance with one or more embodiments.

The caustic map 1330 is generated by applying caustic textures to intersection positions corresponding to particles of a first object.

An expression apparatus in accordance with one or more embodiments applies, to the intersection positions, caustic textures of which an application intensity and an application size are controlled, and generates the caustic map 1330. For example, the expression apparatus allows a predetermined region, for example, a bright region, of a caustic texture of which an application intensity and an application size are controlled to correspond to vertices marked in intersection positions, and generates the caustic map 1330. A caustic texture is applicable to move, for example, a form of a moving image.

The caustic map 1330 is represented in intersection positions corresponding to particles directly visible from a light source, instead of intersection positions 1320 corresponding to particles that are covered by a second object 1310 and that are not directly visible from the light source.

Figure 14:
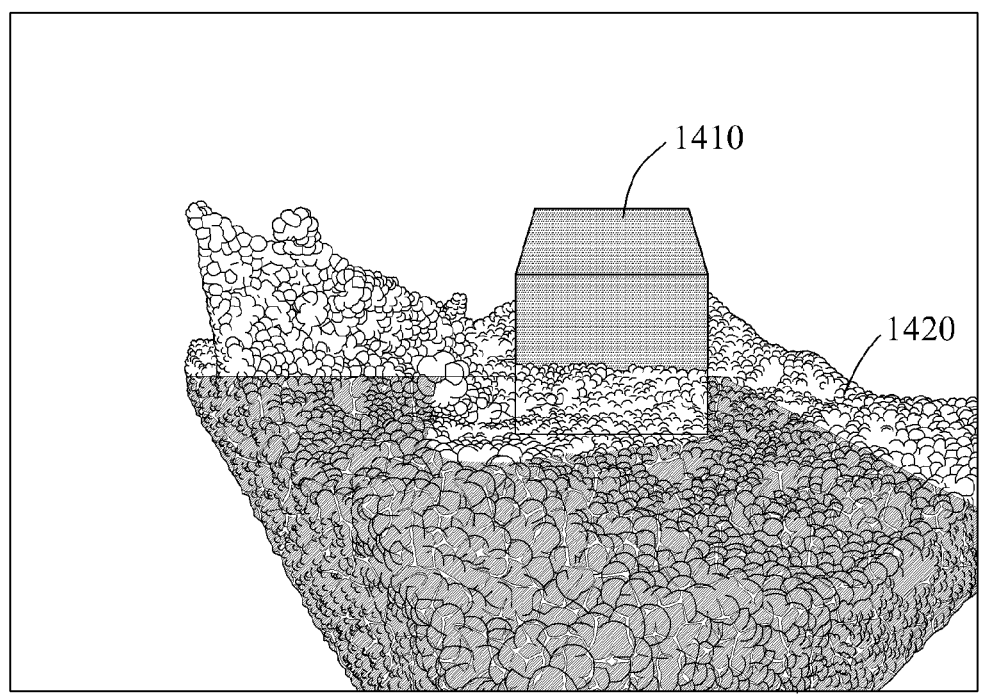
FIG. 14 illustrates a result representing a first object by combining a generated caustic map with other render passes in accordance with one or more embodiments.

FIG. 14 illustrates an example of a result representing a first object by combining a generated caustic map with other render passes in accordance with one or more embodiments.

Referring to FIG. 14, an expression apparatus in accordance with one or more embodiments expresses a second object 1410 and a first object 1420.

The expression apparatus combines a caustic map with various render passes, for example, a reflection, a refraction, a specular map or a diffuse map, and acquires a final expression image as shown in FIG. 14. Render passes are associated with an operation of a graphics processing unit (GPU) to calculate components, for example, a reflection component, a refraction component or a specular component, required to generate a final caustic image. In a refraction pass, the GPU calculates a refraction-related portion and records the refraction-related portion on a map. In a reflection pass, the GPU calculates a reflection-related portion and records the reflection-related portion on a map. The expression apparatus collects the above maps, appropriately connects or combines the collected maps in a final render pass, and visualizes caustics.

Figure 15:
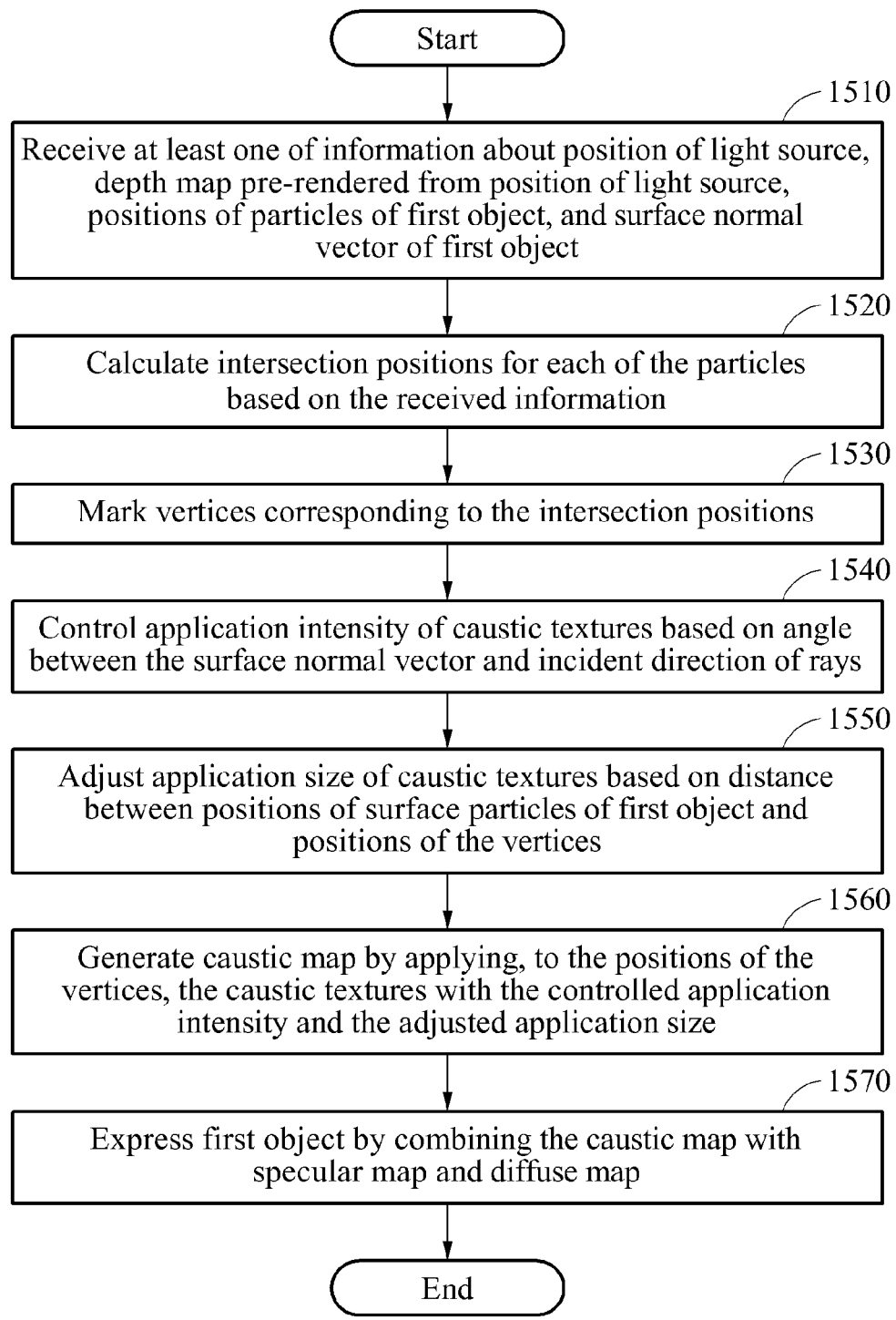
FIG. 15 illustrates a method of expressing caustics in accordance with one or more embodiments.

FIG. 15 illustrates another example of a method of expressing caustics in accordance with one or more embodiments.

Referring to FIG. 15, in operation 1510, an expression apparatus in accordance with one or more embodiments receives at least one information among a position of a light source, a depth map pre-rendered from the position of the light source, positions of particles, and a surface normal vector of the first object.

In operation 1520, the expression apparatus calculates intersection positions for each of the particles based on the received information.

In operation 1530, the expression apparatus marks vertices corresponding to the intersection positions.

In operation 1540, the expression apparatus controls an application intensity of a caustic texture based on an angle between the surface normal vector of the first object and an incident direction of rays.

In operation 1550, the expression apparatus adjusts an application size of a caustic texture based on a distance between positions of surface particles of the first object and positions of the vertices.

In operation 1560, the expression apparatus generates a caustic map by applying, to the positions of the vertices, the caustic textures of which the application intensity is controlled in operation 1540 and the application size is adjusted in operation 1550.

In operation 1570, the expression apparatus expresses the first object by combining the caustic map with a specular map and a diffuse map.

Figure 16:
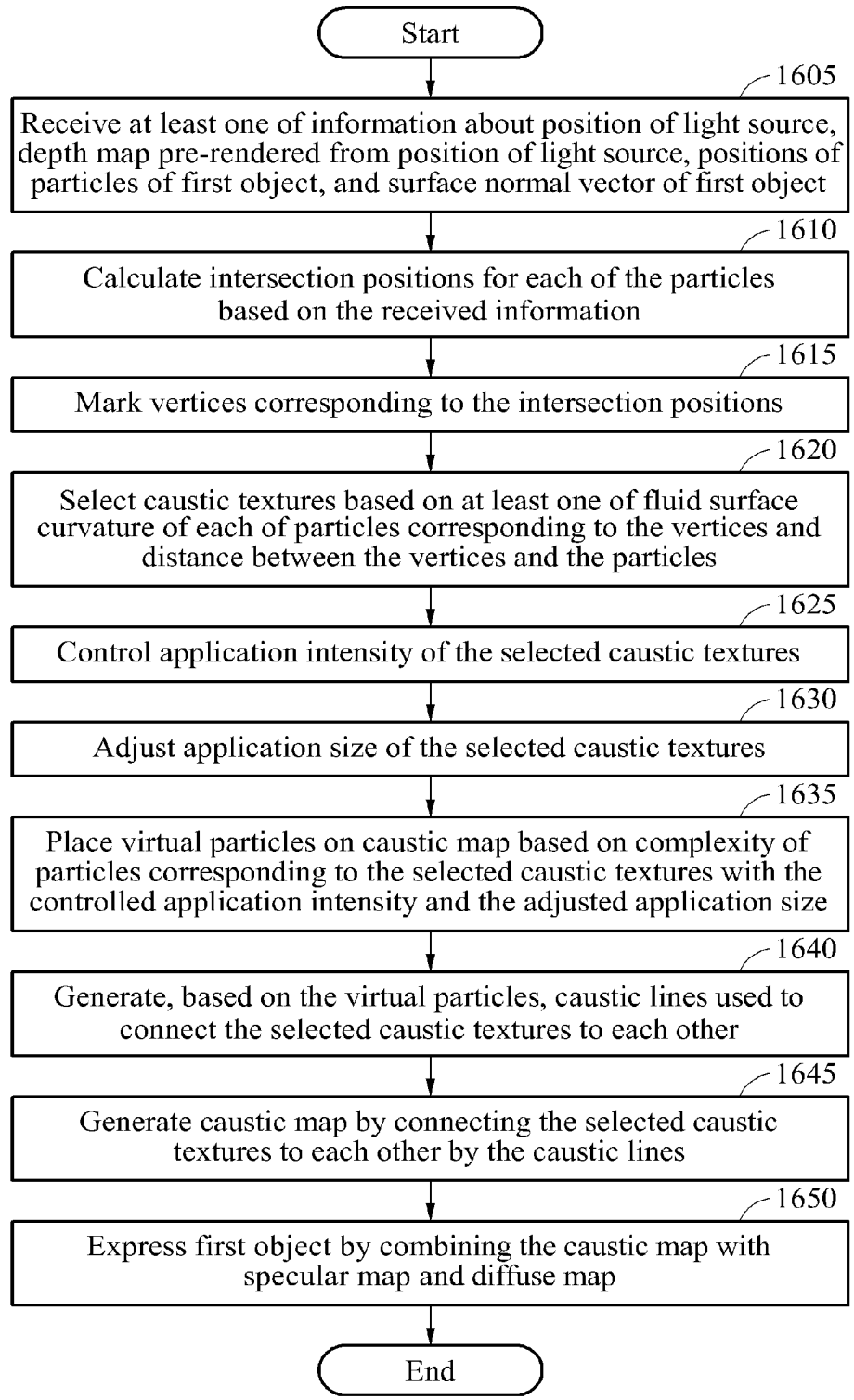
FIG. 16 illustrates a method of expressing caustics in accordance with one or more embodiments.

FIG. 16 illustrates still another example of a method of expressing caustics in accordance with one or more embodiments. Referring to FIG. 16, in operation 1605, an expression apparatus in accordance with one or more embodiments receives at least one information among a position of a light source, a depth map pre-rendered from the position of the light source, positions of particles, and a surface normal vector of the first object.

In operation 1610, the expression apparatus calculates intersection positions for each of the particles based on the received information.

In operation 1615, the expression apparatus marks vertices corresponding to the intersection positions.

In operation 1620, the expression apparatus selects caustic textures based on at least one of a fluid surface curvature of each of particles corresponding to the vertices and a distance between the vertices and the particles.

In operation 1625, the expression apparatus controls an application intensity of the selected caustic textures. For example, the expression apparatus controls an application intensity of a caustic texture based on an angle between the surface normal vector of the first object and an incident direction of rays.

In operation 1630, the expression apparatus adjusts an application size of the selected caustic textures. For example, the expression apparatus adjusts an application size of a caustic texture based on a distance between positions of surface particles of the first object and positions of the vertices.

In operation 1635, the expression apparatus places virtual particles on a caustic map based on a complexity of particles corresponding to the caustic textures with the controlled application intensity and the adjusted application size.

In operation 1640, the expression apparatus generates, based on the virtual particles, caustic lines used to connect the caustic textures with the controlled application intensity and the adjusted application size to each other.

In operation 1645, the expression apparatus generates the caustic map by connecting the caustic textures to each other by the caustic lines.

In operation 1650, the expression apparatus expresses the first object by combining the caustic map with a specular map and a diffuse map.

Figure 17:
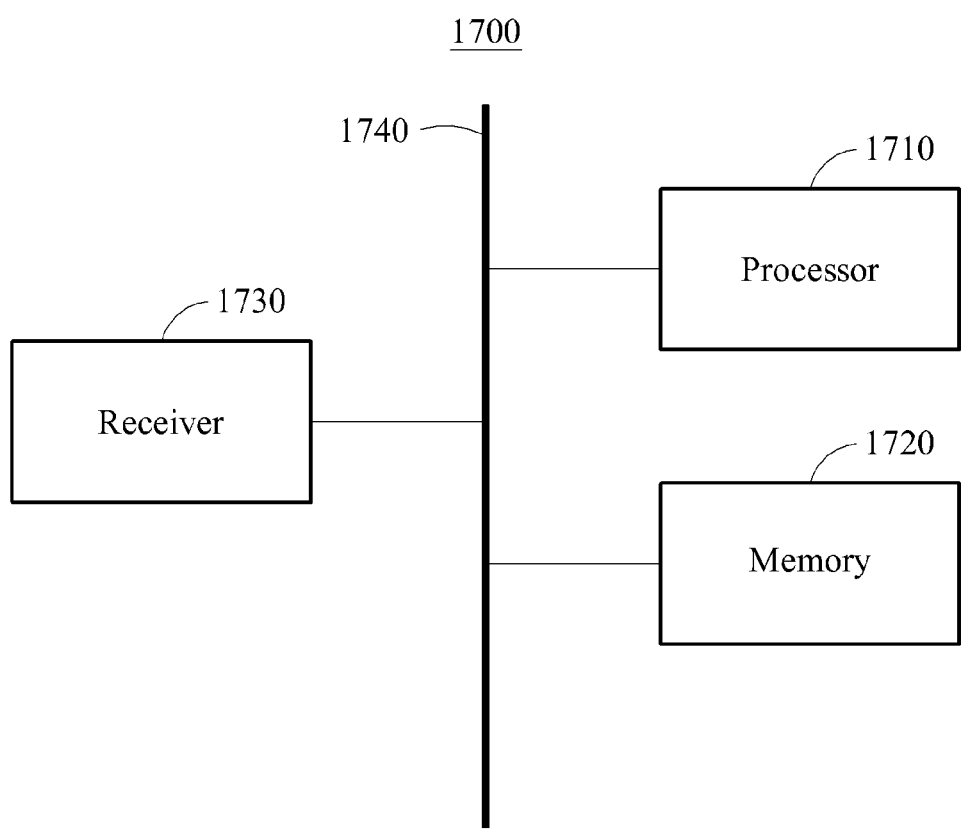
FIG. 17 illustrates an expression apparatus in accordance with one or more embodiments.

FIG. 17 illustrates an an expression apparatus 1700 in accordance with one or more embodiments. Referring to FIG. 17, the expression apparatus 1700 includes a processor 1710, a memory 1720, and a receiver 1730. The processor 1710, the memory 1720 and the receiver 1730 communicate with each other via a bus 1740.

The processor 1710 calculates intersection positions at which rays emitted from a light source pass through particles of a first object and meet a second object, and expresses the first object using a caustic map generated by applying caustic textures to the intersection positions.

The memory 1720 stores one or more caustic textures.

The receiver 1730 receives at least one information among: a position of the light source, a depth map pre-rendered from the position of the light source, positions of the particles, and a surface normal vector of the first object. The processor 1710 calculates the intersection positions for each of the particles based on the information received by the receiver 1730.

The processor 1710 determines particles directly visible from the light source among the particles and calculates intersection positions for the particles directly visible from the light source.

Also, the processor 1710 controls an application intensity of a caustic texture based on an angle between the surface normal vector of the first object and an incident direction of the rays. The processor 1710 adjusts an application size of a caustic texture based on a distance between positions of surface particles of the first object and intersection positions corresponding to the surface particles.

The processor 1710 marks vertices corresponding to the intersection positions, and applies the caustic textures to the vertices.

The processor 1710 selects caustic textures based on at least one of a fluid surface curvature of each of particles corresponding to the vertices and a distance between the vertices and the particles, and places the selected caustic textures on the caustic map to correspond to the vertices.

The processor 1710 places virtual particles on the caustic map based on a complexity of particles corresponding to the selected caustic textures, generates, based on the virtual particles, caustic lines used to connect the selected caustic textures to each other, and connects the selected caustic textures to each other by the caustic lines.

In addition, the processor 1710 performs at least one of the operations described above with reference to FIGS. 1 through 16. The processor 1710 executes a program and controls the expression apparatus 1700. A program code executed by the processor 1710 is stored in the memory 1720. The expression apparatus 1700 is connected to an external apparatus, for example, a personal computer (PC) or a network, via an input/output device (not shown), and exchanges data with the external apparatus.

At least one of the operations described above with reference to FIGS. 1 through 16 is used in combination with software to edit a three-dimensional (3D) image or a 3D graphic image. Also, at least one of the operations described above with reference to FIGS. 1 through 16 is implemented in the form of an application operating in a processor included in a tablet or a smartphone, or in the form of a chip, and is included in a display.

FIG. 18 illustrates an example of an operation of a processor 1800 in an expression apparatus in accordance with one or more embodiments. Referring to FIG. 18, the processor 1800 includes the vertex shader 1810 and a fragment shader 1820.

The processor 1800 determines whether rays and a second object collide with each other, for each particle, and expresses caustics using the vertex shader 1810 and/or the fragment shader 1820 at least once.

The processor 1800 receives, as inputs, information, for example, positions of particles, a surface normal vector of the first object, a position of a light source and/or a depth map pre-rendered from the position of the light source.

The vertex shader 1810 calculates intersection positions based on the received information. The vertex shader 1810 calculates intersection positions with a neighboring second object (for example, a bottom surface) for particles that directly receives light, that is, particles directly visible from a light source, among particles viewed from a position of a camera. Whether a ray directly reaches a particle is determined, in one or more embodiments, by comparing depth information of a depth map rendered from a position of the light source and depth information of a particle viewed from a camera in a space of the light source.

The fragment shader 1820 generates a caustic map by combining caustic textures in the intersection positions received from the vertex shader 1810, and transfers the caustic map to the processor 1800. The processor 1800 combines the caustic map with another rendering element and generates a final first object rendering image.

According to one or more embodiments, to perform calculation to locate intersection positions for each pixel, a fragment shader, for example, may be used instead of a vertex shader. Even though the fragment shader calculates intersection positions due to a characteristic of hardware that a position (for example, an intersection position) in which a caustic is to be drawn is determined using a vertex shader instead of using a fragment shader, it is generally very difficult to directly apply caustic textures to the calculated intersection positions. Accordingly, when calculation to locate intersection positions is performed for each pixel, each of the vertex shader and the fragment shader may be used twice to express caustics.

In accordance with one or more embodiments, a vertex shader calculates intersection positions for each particle, and directly transfers the calculated intersection positions to a fragment shader, and thus it is possible to reduce a number of calculations and to increase a modeling speed, in comparison to calculation of intersection positions for each pixel. Also, it is possible to reduce a number of times each of the shaders are used, for example, by approximately half. In addition, because performing input and output processes to transfer the calculated intersection positions to a next operation, may be avoided, it is possible to more efficiently render, express, or display caustics.

Once a suitable rendering of the scene has been performed, the scene may then be displayed to the user via an interactive image display apparatus such as a monitor, or a tangible, static representation, such as a paper print-out generated by a printer. Additionally, the rendered scene may be interacted with by the user, by editing, manipulating, or changing viewpoints such as in a three dimensional video game or virtual reality scene.

A computing system or a computer may include a microprocessor that is electrically connected to a bus, a user interface—such as input device and output devices e.g. Monitor, projector, head-mounted display, and the like, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), or any other device known to one of ordinary skill in the art as being suitable for inclusion in a computing system or computer. The memory controller and the flash memory device may constitute a solid-state drive or disk (SSD) that uses non-volatile memory to store data.

The image display apparatus described herein may be implemented using a liquid crystal display (LCD), a light-emitting diode (LED) display, a plasma display panel (PDP), a screen, a terminal, or any other type of display known to one of ordinary skill in the art. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as a mouse, a keyboard, a touch screen, a monitor, a speaker, a screen, or a software module for controlling the input/output device.

The apparatuses, units, modules, devices, and other components illustrated in FIGS. 17 and 18 that perform the operations described herein with respect to any one of FIGS. 1, 2, 3, 4, 6, 10, 11, 12, 15 and 16 are implemented by hardware components. Examples of hardware components include controllers, sensors, generators, drivers, and any other electronic components known to one of ordinary skill in the art. In one or more embodiments, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to any one of FIGS. 1, 2, 3, 4, 6, 10, 11, 12, 15 and 16. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, after gaining a thorough understanding of the present disclosure, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

Unless indicated otherwise, a statement that a first layer or object is "on" a second layer or object or a substrate is to be interpreted as covering both a case where the first layer directly contacts the second layer or the substrate, and a case where one or more other layers are disposed between the first layer and the second layer or the substrate.

Words describing relative spatial relationships, such as "below", "beneath", "under", "lower", "bottom", "above", "over", "upper", "top", "left", and "right", may be used to conveniently describe spatial relationships of one device, objects, or elements with other devices, objects, or elements. Such words are to be interpreted as encompassing a space oriented as illustrated in the drawings, and in other orientations in use or operation. For example, a space includes a second layer disposed above a first layer based on the orientation of the first space or the scene illustrated in the drawings also encompasses the scene or first space when flipped upside down in use or operation.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of displaying caustics, the method comprising:
actuating a graphical processing unit (GPU) to
determine intersection positions on a second object, at which rays emitted from a light source that have passed through particles of a first object meet the second object, by calculating intersection positions only for particles directly visible from the light source among the particles,
apply caustic textures to the intersection positions at the second object,
generate a caustic map by connecting the caustic textures to each other by caustic lines, and
render the first object using the caustic map based on a result of the applying of the caustic textures to the intersection positions to generate a three-dimensional (3D) image comprising the rendered first object for display.

2. The method of claim 1, wherein the determining of the intersection positions comprises tracing a path of the rays and calculating the intersection positions for each of the particles.

3. The method of claim 1, further comprising receiving any one or any combination of any two or more of information about a position of the light source, a depth map pre-rendered from the position of the light source, positions of the particles, and a surface normal vector of the first object,
wherein the determining of the intersection positions comprises calculating the intersection positions for each of the particles based on the received information.

4. The method of claim 1, further comprising determining the particles directly visible from the light source among the particles, based on first depth information of a depth map pre-rendered from a position of the light source.

5. The method of claim 4, wherein the determining of the particles directly visible from the light source comprises determining whether the rays directly reach the particles based on a result of a comparison between the first depth information and second depth information of the particles, the second depth information being acquired by converting positions of the particles viewed from a viewpoint to a space of a virtual camera in the position of the light source.

6. The method of claim 1, wherein the applying of the caustic textures to the intersection positions comprises:
marking vertices corresponding to the intersection positions; and
applying the caustic textures to the vertices.

7. The method of claim 6, wherein the applying of the caustic textures to the vertices comprises:
selecting the caustic textures based on either one or both of a fluid surface curvature of each of the particles corresponding to the vertices and a distance between the vertices and the particles; and
placing the selected caustic textures on the caustic map to correspond to the vertices.

8. The method of claim 7, wherein
the placing of the selected caustic textures on the caustic map comprises placing virtual particles on the caustic map based on a complexity of particles corresponding to the selected caustic textures, the complexity being based on any one or any combination of any two or more of fluid surface curvature of each of particles corresponding to vertices, a distance between the vertices and the particles, a controlled application intensity of the selected caustic textures, and an adjusted application size of the selected caustic textures, and
the selected caustic textures are connected to each other by the caustic lines.

9. The method of claim 8, wherein the generating of the caustic lines comprises generating the caustic lines at equal distances from particles corresponding to an outline of each of the selected caustic textures and neighboring virtual particles.

10. The method of claim 1, wherein the applying of the caustic textures to the intersection positions comprises controlling an application intensity of the caustic textures based on an angle between a surface normal vector of the first object and an incident direction of the rays.

11. The method of claim 10, wherein the controlling of the application intensity comprises:
increasing the application intensity in response to the surface normal vector being parallel to the incident direction; and
decreasing the application intensity in response to the surface normal vector being perpendicular to the incident direction.

12. The method of claim 1, wherein the applying of the caustic textures to the intersection positions comprises adjusting an application size of the caustic textures based on a distance between positions of surface particles of a surface of the first object and intersection positions corresponding to the surface particles.

13. The method of claim 12, wherein the adjusting of the application size comprises:
adjusting the application size so that the caustic textures appear larger in response to the distance being greater than a preset reference value; and
adjusting the application size so that the caustic textures appear smaller in response to the distance being less than the reference value.

14. The method of claim 1, wherein the rendering of the first object comprises combining the caustic map with either one or both of a specular map and a diffuse map.

15. The method of claim 1, wherein the caustic textures are stored in advance in correspondence to the particles, or are generated by connecting and interpolating the stored caustic textures based on light and an external force exerted on the first object.

16. The method of claim 1, wherein the first object has transparent or semitransparent properties allowing the rays to be refracted and reflected by passing through the first object.

17. The method of claim 1, further comprising, actuating a monitor to display the rendered first object to a user.

18. A non-transitory computer readable medium storing instructions for causing computing hardware to perform the method of claim 1.

19. A caustic rendering apparatus, comprising:
a graphical processing unit (GPU) configured to
determine intersection positions on a second object, at which rays emitted from a light source that have passed through particles of a first object meet the second object, by calculating intersection positions only for particles directly visible from the light source among the particles, apply caustic textures to the intersection positions at the second object, generate a caustic map by connecting the caustic textures to each other by caustic lines, and render the first object using the caustic map based on a result of the applying of the caustic textures to the intersection positions to generate a three-dimensional (3D) image comprising the rendered first object for display; and a memory coupled to the CPU, and configured to store the caustic textures and the generated 3 dimensional (3D) image.

20. The apparatus of claim 19, further comprising an interface coupled to the GPU via a bus, the interface being configured to receive any one or any combination of any two or more of information among a position of the light source, a depth map pre-rendered from the position of the light source, positions of the particles, and a surface normal vector of the first object, wherein the GPU is further configured to calculate the intersection positions for each of the particles based on information received by the interface.

21. The apparatus of claim 19, wherein the GPU is further configured to determine the particles directly visible from the light source among the particles, based on first depth information of a depth map pre-rendered from a position of the light source.

22. The apparatus of claim 19, wherein the GPU is further configured to mark vertices corresponding to the intersection positions, and to apply the caustic textures to the vertices.

23. The apparatus of claim 22, wherein the GPU is further configured to select the caustic textures based on either one or both of a fluid surface curvature of each of the particles corresponding to the vertices and a distance between the vertices and the particles, and to place the selected caustic textures on the caustic map to correspond to the vertices.

24. The apparatus of claim 23, wherein the GPU is further configured to place virtual particles on the caustic map based on a complexity of particles corresponding to the selected caustic textures, the complexity being based on any one or any combination of any two or more of fluid surface curvature of each of particles corresponding to vertices, a distance between the vertices and the particles, a controlled application intensity of the selected caustic textures, and an adjusted application size of the selected caustic textures, and the selected caustic textures are connected to each other by the caustic lines.

25. The apparatus of claim 19, wherein the GPU is further configured to control an application intensity of the caustic textures based on an angle between a surface normal vector of the first object and an incident direction of the rays, and to adjust an application size of the caustic textures based on a distance between positions of surface particles of a surface of the first object and intersection positions corresponding to the surface particles.

26. The apparatus of claim 19, wherein the caustic textures are stored in advance in correspondence to the particles, or are generated by connecting and interpolating the stored caustic textures based on light and an external force exerted on the first object.

27. A method of displaying generated caustics in a three-dimensional (3D) image, the method comprising:
actuating a graphical processing unit (GPU) to:
determine intersection positions on a second object at which rays emitted from a light source that have passed through particles of a first object and meet the second object;
generate a caustic map to comprise particles and virtual particles;
apply caustic textures to the intersection positions at the second object;
generate, based on the virtual particles, caustic lines to connect the applied caustic textures; and
render the first object using the caustic map based on a result of the applying of the caustic textures to the intersection positions to generate a 3D image comprising the rendered first object for display.

* * * * *